US008754840B2

(12) United States Patent  
Miura

(10) Patent No.: US 8,754,840 B2  
(45) Date of Patent: Jun. 17, 2014

(54) IMAGE DISPLAY APPARATUS

(75) Inventor: Aruo Miura, Tokyo (JP)

(73) Assignee: Sony Corporation (JP)

( * ) Notice: Subject to any disclaimer, the term of this patent is extended or adjusted under 35 U.S.C. 154(b) by 1441 days.

(21) Appl. No.: 12/229,554

(22) Filed: Aug. 25, 2008

(65) Prior Publication Data

US 2009/0059097 A1     Mar. 5, 2009

(30) Foreign Application Priority Data

Aug. 31, 2007   (JP) ................... P2007-226322

(51) Int. Cl.
    *G09G 3/36* (2006.01)
    *G09G 5/10* (2006.01)

(52) U.S. Cl.
    USPC ............... 345/102; 345/87; 345/89; 345/690; 345/691

(58) Field of Classification Search
    None
    See application file for complete search history.

(56) References Cited

U.S. PATENT DOCUMENTS

| | | | |
|---|---|---|---|
| 6,674,420 B2 * | 1/2004 | Matsueda et al. | 345/87 |
| 8,077,259 B2 * | 12/2011 | Zhang et al. | 348/455 |
| 2005/0052621 A1 * | 3/2005 | Allen et al. | 353/85 |
| 2005/0231457 A1 * | 10/2005 | Yamamoto et al. | 345/102 |
| 2006/0071940 A1 * | 4/2006 | Ouchi | 345/600 |
| 2006/0186826 A1 * | 8/2006 | Miyazawa | 315/169.4 |
| 2006/0284895 A1 * | 12/2006 | Marcu et al. | 345/690 |
| 2009/0267876 A1 * | 10/2009 | Kerofsky | 345/87 |
| 2009/0304274 A1 * | 12/2009 | Yoshii et al. | 345/690 |
| 2009/0322801 A1 * | 12/2009 | Kwisthout et al. | 345/690 |
| 2010/0182346 A1 * | 7/2010 | Sano et al. | 345/690 |
| 2011/0157477 A1 * | 6/2011 | Miyata et al. | 345/87 |

FOREIGN PATENT DOCUMENTS

| | | |
|---|---|---|
| JP | 7-129113 A | 5/1995 |
| JP | 2001-100699 A | 4/2001 |
| JP | 2004-311461 A | 11/2004 |
| JP | 2005-086721 A | 3/2005 |
| JP | 2006-003586 A | 1/2006 |
| JP | 2006-243687 A | 9/2006 |
| JP | 2006-284982 A | 10/2006 |
| JP | 2007-049692 A | 2/2007 |
| JP | 2007-164208 A | 6/2007 |
| JP | 2007-179001 A | 7/2007 |
| JP | 2007-187974 A | 7/2007 |
| JP | 2008-020887 A | 1/2008 |
| WO | 2007-029420 A1 | 3/2007 |

* cited by examiner

*Primary Examiner* — Brian T Pendleton
*Assistant Examiner* — Dika C. Okeke
(74) *Attorney, Agent, or Firm* — Lerner, David, Littenberg, Krumholz & Mentlik, LLP

(57) ABSTRACT

An image display apparatus includes: a light source; a spatial light modulation element modulating light from the light source based on a video signal; light quantity adjustment section adjusting the light quantity of light from the light source based on luminance information in the video signal; image correction section correcting luminance level of the video signal in accordance with light quantity adjustment by the light quantity adjustment section, and supplying a corrected video signal to the spatial light modulation element; and re-adjustment section performing re-adjustment such that a light quantity adjustment target is re-adjusted to a lower value, in a case that a final display luminance level, representing a luminance of the light modulated by the spatial modulation element, is lower than a predetermined first luminance level, where the light quantity adjustment target represents a adjustment target value in the light quantity, employed by the light quantity adjustment section.

18 Claims, 6 Drawing Sheets

IMAGE DISPLAY APPARATUS

CROSS-REFERENCE TO RELATED APPLICATION

The present application claims priority from Japanese Patent Application No. JP 2007-226322, filed in the Japanese Patent Office on Aug. 31, 2007, the entire content of which is incorporated herein by reference.

BACKGROUND OF THE INVENTION

1. Field of the Invention

The present invention relates to an image display apparatus applied to liquid crystal projectors and the like.

2. Description of the Related Art

Projection type display apparatuses, such as liquid crystal projectors, have been widely used which are configured to perform image display by applying spatial modulation to the light passing through a spatial light modulation element, and emitting the light thus modulated, and then collecting and projecting the emitted light in response to the electric signal supplied to the spatial light modulation element. The projection display apparatus of this type generally has a lamp and a focusing mirror as a light source, and an illumination optical system for collecting and admitting the light therefrom into the spatial light modulation element. The light from the spatial light modulation element is projected onto a screen or the like by a projection lens.

As the above-mentioned projection display apparatus, for example, Japanese Unexamined Patent Application Publication No. 2006-3586 has proposed one having a variable iris capable of changing the amount of light interception against the incident light in order to improve sensible contrast feeling. Specifically, when the luminance level of a video signal is high (the image is bright), the iris is opened to make the image look brighter. On the other hand, when the luminance level of a video signal is low (the image is dark), the iris is closed to make the image look darker.

SUMMARY OF THE INVENTION

However, the expression "the image is dark" may indicate "a dark image" necessitating fine gradation expression in the dark, or "a completely dark image." That is, a large difference between "the dark image" and "the completely dark image" is the presence or absence of any tone to be represented. Therefore, if an attempt is made to sufficiently reproduce fine gradation expression when "the image is dark," it becomes necessary to place a definite limit on the light quantity to be reduced, making it difficult to obtain sufficient improvement of sensible contrast feeling.

This issue is not limited to the projection display apparatuses. The same is true for direct-view type display apparatuses such as liquid crystal television sets.

Thus, when the light quantity from the light source is changed with the video signal, it has been difficult for the related art to sufficiently enhance sensible contrast feeling. Hence, there is room for improvement.

It is desirable to provide an image display apparatus capable of more effectively improving sensible contrast feeling when the light quantity from the light source is changed with the video signal.

According to an embodiment of the invention, there is provided an image display apparatus including a light source, a spatial light modulation element, light quantity adjustment means, image correction means and re-adjustment means. The spatial light modulation element modulates light from the light source based on a video signal. The light quantity adjustment means adjusts the light quantity of light from the light source based on luminance information in the video signal. The image correction means corrects luminance level of the video signal in accordance with light quantity adjustment by the light quantity adjustment means, and supplying a corrected video signal to the spatial light modulation element. The re-adjustment means performs re-adjustment such that a light quantity adjustment target is re-adjusted to a lower value, in a case that a final display luminance level, representing a luminance of the light modulated by the spatial modulation element, is lower than a predetermined first luminance level, where the light quantity adjustment target represents a adjustment target value in the light quantity, employed by the light quantity adjustment means. The term "the final display luminance level" means a luminance level taking into account at least the luminance level correction target.

In the image display apparatus of the embodiment of the preset invention, the light from the light source is modulated by the spatial light modulation element based on the video signal, enabling the image display to be performed based on the video signal. Here, the light quantity adjustment of the light quantity of light from the light source is performed based on the luminance information in the video signal, and the correction of the luminance level of the video signal is performed in accordance with the light quantity adjustment. Then, the corrected video signal is supplied to the spatial light modulation element. This enables the light quantity adjustment and the image collection for lowering the black side (the dark side) image luminance, thus improving sensible contrast feeling. Further, when the above-mentioned final display luminance level is lower than a predetermined first luminance level, the re-adjustment means performs the re-adjustment such that the light quantity adjustment target is re-adjusted to a minimum value. In the state lower than the first luminance level, the final display luminance level becomes lower than before re-adjustment.

Preferably, when the above-mentioned final display luminance level is lower than the first luminance level, the re-adjustment means performs the re-adjustment such that the light quantity adjustment target is re-adjusted to a minimum value. Therefore, in the state lower than the first luminance level, the final display luminance level is made lower, further improving sensible contrast feeling.

Preferably, the light quantity adjustment means asymptotically adjusts, frame by frame, the light quantity of the light from the light source based on the light quantity adjustment target re-adjusted by the re-adjustment means. In this case, for example, when displaying the image having large luminance variations with time, such as the image having frequent flickering, the discontinuity in light quantity adjustment amount is reduced to suppress the transient influence.

Preferably, the light quantity adjustment means adjusts light quantity of light from the light source based on luminance information in the video signal and the image correction means corrects the luminance level of the video signal in accordance with light quantity adjustment by the light quantity adjustment means. In this case, the light quantity adjustment and the image correction are performed properly based on the luminance information in the video signal, and hence the black side (the dark side) image luminance is lowered to improve sensitive contrast feeling.

Alternatively, when the final display luminance level is higher than a predetermined second luminance level, the re-adjustment means performs the re-adjustment such that, of a light quantity adjustment target and a luminance level correction target, at least the luminance level correction target is re-adjusted to a value in an opposite direction from a correction direction by the image correction means, where the luminance level correction target represents a correction target value in the luminance level of the video signal, employed by the image correction means. In this case, the excessive light quantity adjustment and image correction are reduced in the white side (the bright side) image, thereby reducing the deterioration of fine gradation expression which occurs along with the effect of improving sensible contrast feeling.

Preferably, when the final display luminance level is higher than the predetermined second luminance level, the re-adjustment means re-adjusts the light quantity adjustment target into a non-adjusted value, and re-adjusts the luminance level correction target into a non-corrected value. In this case, the light quantity of the light from the light source and the video signal luminance level are re-adjusted to the pre-adjustment value and the pre-correction value, respectively. Therefore, it becomes possible to completely eliminate the excessive light quantity adjustment and image correction. This enables to avoid the deterioration of fine gradation expression and hold the state prior to the light quantity adjustment and the image correction.

According to the image display apparatus of the embodiment of the invention, the light quantity of the light from the light source is adjusted based on the luminance information in the video signal, and the video signal luminance level is corrected in accordance with the light quantity adjustment. It is therefore capable of performing the light quantity adjustment and the image correction for lowering the black side (the dark side) image luminance, thereby improving sensible contrast feeling. When the above-mentioned final display luminance level is lower than the predetermined first luminance level, it is configured to re-adjust so that the adjusted light quantity becomes smaller than the value set by the light quantity adjustment means. Consequently, in the state lower than the above-mentioned first luminance level, the final display luminance level is made lower than before re-adjustment. It is thus possible to more effectively improve sensible contrast feeling when the light quantity from the light source is changed with the video signal.

Other and further objects, features and advantages of the invention will appear more fully from the following description.

DESCRIPTION OF THE PREFERRED EMBODIMENTS

Preferred embodiments of the present invention will now be described in detail with reference to the accompanying drawings.

First Embodiment

Figure 1:
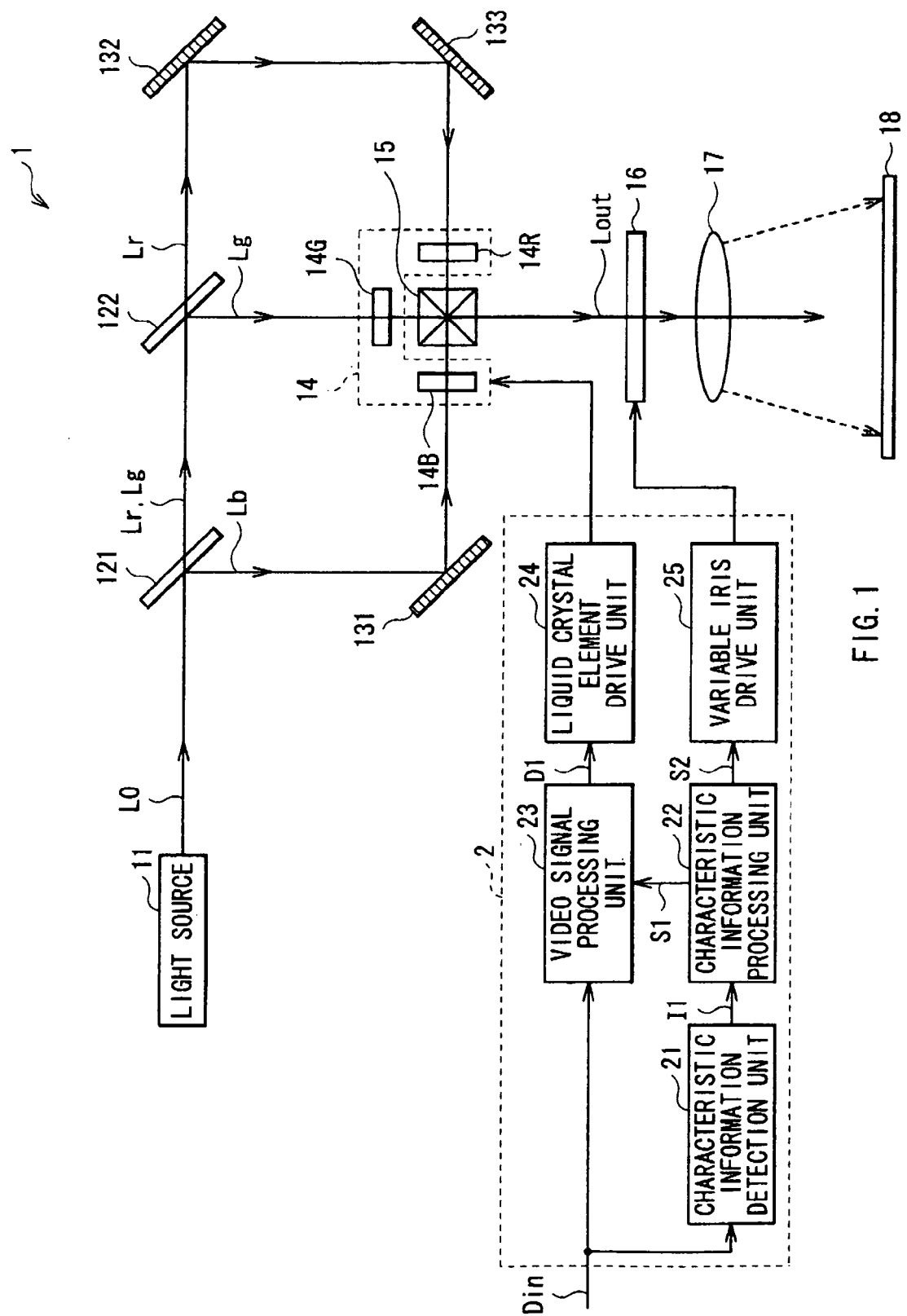
FIG. 1 is a block diagram showing the configuration of an image display apparatus according to a first embodiment of the invention.

FIG. 1 shows the overall configuration of an image display apparatus (a liquid crystal projector 1) according to a first embodiment of the invention. The liquid crystal projector 1 performs image display based on an input video signal Din supplied from the external, and includes a light source 11, dichroic mirrors 121 and 122, reflection mirrors 131, 132 and 133, a light modulator 14, a dichroic prism 15, a variable iris 16, a projection lens 17, a screen 18, and a controller 2 to control the light modulator 14 and the variable iris 16, based on the input video signal Din.

The light source 11 emits white light (irradiation light) containing the primary colors of light, namely red light Lr, green light Lg and blue light Lb, and is constructed from, for example, a halogen lamp, a metal halide lamp or a xenon lamp.

The dichroic mirror 121 transmits the red light Lr and the green light Lg and reflects the blue light Lb in the irradiation light emitted from the light source 11, causing the red light Lr and the green light Lg to travel separately from the blue light Lb. The dichroic mirror 122 transmits the red light Lr from among the red light Lr and the green light Lg passed through the dichroic mirror 121, and reflects the green light Lg, causing the red light Lr and the green light Lg to travel separately from each other. The green light Lg reflected by the dichroic mirror 122 travels toward the light modulator 14.

The reflection mirror 131 reflects the blue light Lb reflected by the dichroic mirror 121 toward the light modulator 14. The reflection mirrors 132 and 133 reflect the red light Lr reflected by the dichroic mirror 122 toward the light modulator 14.

The light modulator 14 includes three liquid crystal elements 14R, 14G and 14B corresponding to these three primary colors of light, namely the red light Lr, the green light Lg and the blue light Lb, and modulates per primary color of light the irradiation light emitted from the light source 11 based on the video signals for their respective lights supplied from the controller 2.

Specifically, the liquid crystal element 14R is disposed between the reflection mirror 133 and the dichroic prism 15, and modulates the incident red light Lr based on the video signal for red color supplied from the controller 2. The liquid crystal element 14G is disposed between the dichroic mirror 122 and the dichroic prism 15, and modulates the incident green light Lg based on the video signal for green color supplied from the controller 2. The liquid crystal element 14B is disposed between the reflection mirror 131 and the dichroic prism 15, and modulates the incident blue light Lb based on the video signal for blue color supplied from the controller 2. These liquid crystal elements 14R, 14G and 14B have the configuration that a liquid crystal layer containing liquid crystal molecules is disposed between a pair of substrates, to which a drive voltage based on a video signal is applied.

The dichroic prism 15 generates a mixed light (a display light) Lout by mixing the red light Lr, the green light Lg and the blue light Lb modulated by the liquid crystal elements 14R, 14G and 14B, respectively, and causes the display light Lout to travel toward an optical path (the optical path toward the variable iris 16 and the projection lens 17).

The variable iris 16 is arranged between the dichroic prism 15 and the projection lens 17, and is a mechanical shutter having an aperture (not shown) whose size is variable. Specifically, the aperture size is increased or decreased under the control of the controller 2 described later. Thus, the amount of light cut away from the incident light (the display light Lout supplied from the dichroic prism 15) is changed (adjusted) so that the light quantity of the incident light (the light from the light source 11) described later is decreased. The light quantity of the incident light, as will be described later in detail, is adjusted based on the luminance information in the input video signal Din (for example, a luminance histogram distribution H1 described later).

The projection lens 17 is arranged between the variable iris 16 and the screen 18. The display light Lout, after being subjected to the modulation at the liquid crystal elements 14R, 14G and 14B and then the light quantity adjustment at the variable iris 16, is projected onto the screen 18 by the projection lens 17.

The controller 2 has a characteristic information detection unit 21, a characteristic information processing unit 22, a video signal processing unit 23, a liquid crystal element drive unit 24 and a variable iris drive unit 25.

The characteristic information detection unit 21 detects characteristic information I1 as to whether the input image is a bright scene or a dark scene (for example, a detected characteristic point luminance described later) by extracting the characteristics of luminance information in the input video signal Din, and supplies the characteristic information I1 to the characteristics information processing unit 22. Specifically, it is configured to detect the characteristic information I1 by extracting, as information, the maximum luminance, the average luminance, the minimum luminance and the like, by using, for example, the luminance histogram distribution H1 shown in FIG. 2, an RGB histogram distribution (not shown) or the like.

Based on the characteristic information I1 supplied from the characteristic information detection unit 21, the characteristic information processing unit 22 supplies a light quantity control signal S2 to the variable iris drive unit 25 so that the light quantity adjustment is performed to decrease the light quantity of the display light Lout (the light from the light source 11). The characteristic information processing unit 22 also supplies an image control signal S1 to the video signal processing unit 23 so that an image correction is performed to increase the luminance level of the input video signal Din in accordance with the light quantity adjustment amount generated by the variable iris 16. These enable improvement of sensible contrast feeling on the display image, as will be described in detail later.

When the final display luminance state (the final luminance state with respect to a user) corresponding to the luminance state of the light modulated by the liquid crystal elements 14R, 14G and 14B (the display light Lout) is darker than a predetermined first luminance state, the characteristic information processing unit 22 re-adjusts so that the setting value of the light quantity control signal S2 (an adjusted light quantity) obtained at the processing unit 22 becomes smaller than before setting (i.e. performs the re-adjustment processing of the adjustment value). Specifically, when the light quantity after being adjusted by the variable iris 16 is within a certain range smaller than a predetermined first light quantity threshold value (a light quantity threshold value Lth1 described later), the setting value of the light quantity control signal S2 (an adjusted light quantity) is re-adjusted so that the adjusted light quantity becomes smaller than the set value. That is, based on the characteristic information I1 supplied from the characteristic information detection unit 21 (e.g. the information related to the maximum luminance in the luminance histogram distribution H1), the characteristic information processing unit 22 distinguish whether it is a completely black (completely dark) image or a dark image including a part existing fine gradation expression, and when it is the completely dark image, re-adjusts the setting value of the light quantity control signal S2 (the adjusted light quantity) so that the display light Lout has a further lower luminance. The term "the completely dark image" indicates, for example, that all pixels within a display screen exist in luminance regions having a luminance level of 3 to 5% or less in the luminance histogram distribution H1. The term "a certain range" depends on the desired image representation and image correction method of a display apparatus, thus correction is necessary per equipment. For example, the certain range corresponds to the case where the light quantity adjustment is performed so that the light quantity after adjusted by the variable iris 16 becomes an approximately 3 to 5% of the light quantity before adjustment. The details of the adjustment value re-adjustment processing by the characteristic information processing unit 22 will be described later.

Figure 3:
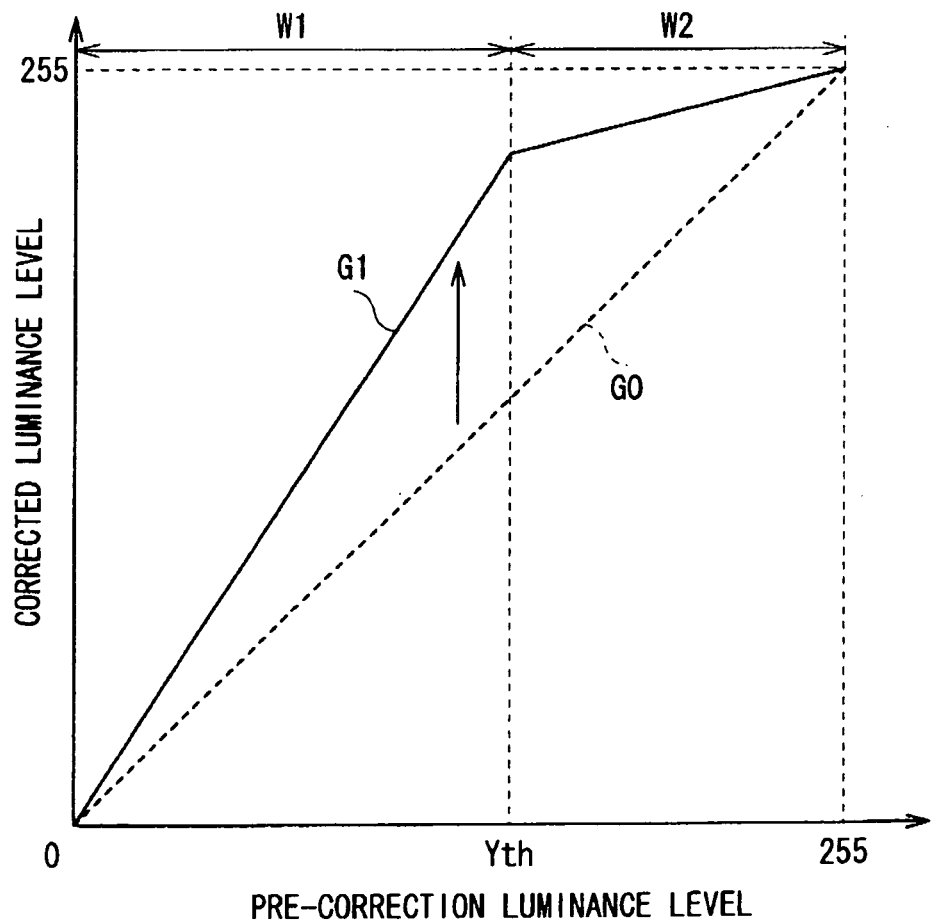
FIG. 3 is a characteristic diagram for explaining an example of input video signal correction processing in a video signal processing unit.

The video signal processing unit 23 applies white balance adjustment and so-called gamma correction for adjusting the color temperature of video signals, to the input video signal Din, and applies image correction as shown by the arrow in FIG. 3, to the input video signal Din in response to the image control signal S1 supplied from the characteristic information processing unit 22. Specifically, the video signal processing unit 23 performs the image correction so that the luminance level of the input video signal Din is increased in accordance with the light quantity adjustment amount generated by the variable iris 16 (the setting value of the light quantity control signal S2) by applying an image correction as shown by the straight line indicated by reference G1 in FIG. 3, to the straight line indicated by reference G0 in FIG. 3 (a pre-correction luminance level characteristic). The video signal processing unit 23 then supplies a post-correction video signal D1 to the liquid crystal element drive unit 24. In FIG. 3, a luminance region W1 indicates a luminance region where the luminance level range is expanded by the above-mentioned image correction, and a luminance region W2 indicates a luminance region where the luminance level range is compressed by the above-mentioned image correction. That is, in the luminance region having a higher luminance than a luminance threshold value Yth (i.e. a bright luminance region), the luminance level range is compressed by the image correction.

The liquid crystal element drive unit 24 drives the liquid crystal elements 14R, 14B and 14G, based on the post-correction video signal D1 supplied from the video signal processing unit 23.

The variable iris drive unit 25 is configured to have a motor for displacing the opening of the variable iris 16 and a motor driver driving the motor, and controls the area of the aperture in the variable iris 16, specifically adjusts the light quantity of the incident light into the variable iris 16 based on the light control signal S2 supplied from the characteristic information processing unit 22.

In the present invention, the liquid crystal elements 14R, 14B and 14G correspond to specific example of "spatial light modulation element," the variable iris 16 corresponds to a specific example of "light quantity adjustment means," and the projection lens 17 corresponds to a specific example of "projection means." The video signal processing unit 23 corresponds to a specific example of "image correction means" and the characteristic information processing unit 22 corresponds to a specific example of "re-adjustment means."

Figure 4:
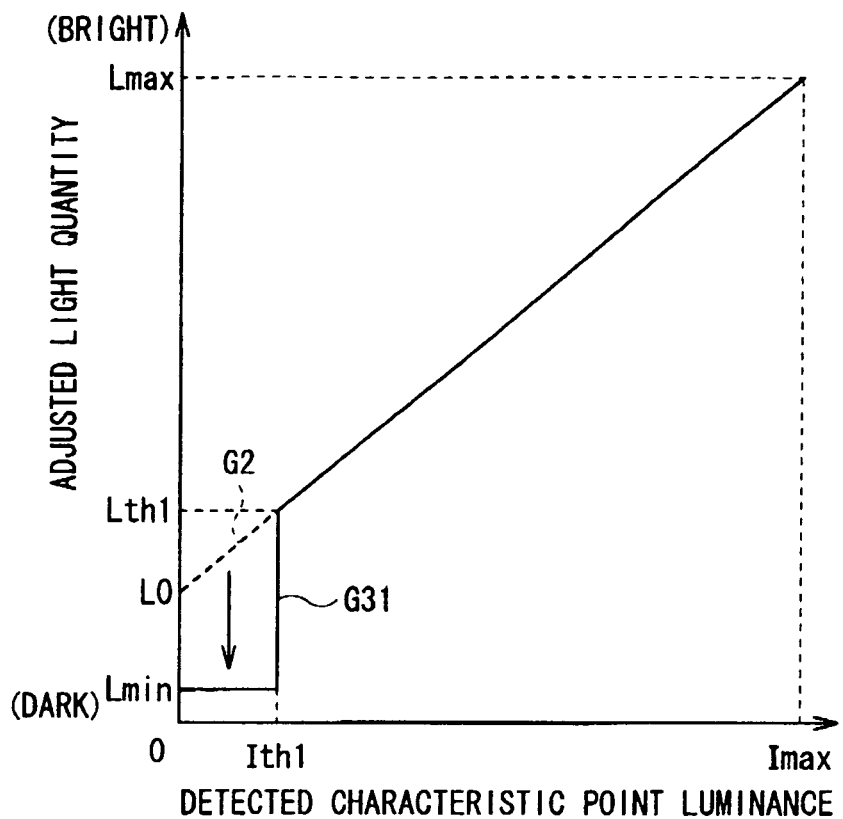
FIG. 4 is a characteristic diagram for explaining an example of re-adjustment processing of adjusted light quantity in a characteristic information processing unit in the first embodiment.

The operation of the liquid crystal projector 1 of the first embodiment will be described in detail with reference to FIGS. 1 to 4. FIG. 4 shows an example of adjustment value re-adjustment processing (the re-adjustment processing of an adjusted light quantity) by the characteristic information processing unit 22.

In the liquid crystal projector 1, as shown in FIG. 1, the irradiation light emitted from the light source 11 is separated into red light Lr and green light Lg, and blue light Lb by the dichroic mirror 121, and further the red light Lr and the green light Lg are separated from each other by the dichroic mirror 122. The separated red light Lr enters through the reflection mirrors 132 and 133 to the liquid crystal element 14R, the separated green light Lg directly enters the liquid crystal element 14G, and the separated blue light Lb enters through the reflection mirror 131 to the liquid crystal element 14B. These primary colors of light Lr, Lg and Lb are modulated in the liquid crystal elements 14R, 14G and 14B, based on their corresponding video signals supplied from the controller 2, respectively. These primary colors of light Lr, Lg and Lb thus modulated are mixed into a display light Lout by the dichroic prism 15. The light quantity of the display light Lout is adjusted by the variable iris 16 and then projected onto the screen 18 by the projection lens 17, achieving the image display based on the input video signal Din.

Figure 2:
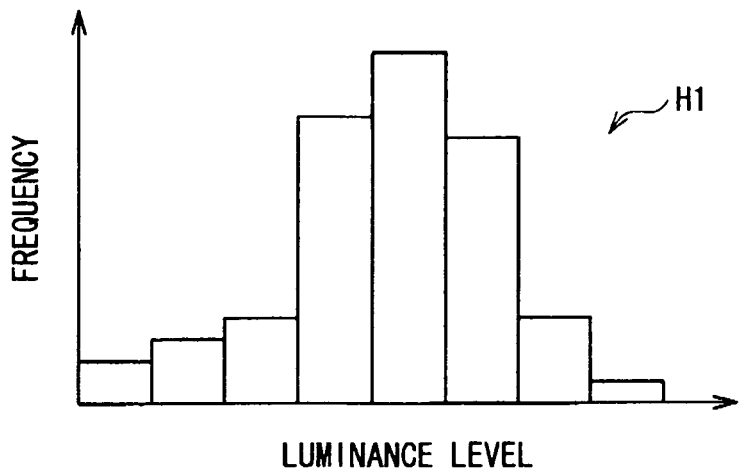
FIG. 2 is a characteristic diagram showing an example of luminance histogram distribution used in a characteristic point information detection unit.

In the controller 2, the characteristic information detection unit 21 extracts the characteristic of luminance information in the input video signal Din (for example, the luminance histogram distribution H1 shown in FIG. 2), thereby detecting and supplying characteristic information I1 (for example, the detected characteristic point luminance described later) to the characteristic information processing unit 22. In the characteristic information processing unit 22, based on the characteristic information I1, the light quantity control signal S2 is supplied to the variable iris drive unit 25 so as to perform a light quantity adjustment for decreasing the light quantity of the display light Lout (the light from the light source 11), and the image control signal S1 is supplied to the video signal processing unit 23 so as to perform an image correction for increasing the luminance level of the input video signal Din in accordance with the light quantity adjustment amount generated by the variable iris 16. In the characteristic information processing unit 22, based on the image control signal S1, the image correction for increasing the luminance level of the input video signal Din is applied to the input video signal Din, for example, as shown by the arrow in FIG. 3, and a post-correction video signal D1 is supplied to the liquid crystal element drive unit 24. Based on the post-correction video signal D1 and the light quantity control signal S2, the liquid crystal element drive unit 24 and the variable iris drive unit 25 drive the liquid crystal elements 14R, 14G and 14B and the variable iris 16 to modulate these primary colors of light Lr, Lg and Lb in the liquid crystal elements 14R, 14G and 14B, respectively, so as to increase the luminance level of the input video signal Din as shown in FIG. 3. On the other hand, the variable iris 16 performs light quantity adjustment so that the light quantity of the display light Lout (the light from the light source 11) is decreased in accordance with the characteristic information I1 (the detected characteristic point luminance), as illustrated by the straight line indicated by a reference G2 in FIG. 4. Consequently, the black side (the dark side) image luminance is lowered to improve the sensible contrast feeling in the display image based on the display light Lout on the screen 18.

When the final display luminance state (the final luminance state with respect to the user) corresponding to the luminance state of the light modulated by the liquid crystal elements 14R, 14G and 14B (the display light Lout) is darker than a predetermined first luminance state, the characteristic information processing unit 22 re-adjusts the setting value of the light quantity control signal S2 generated by the characteristic information processing unit 22 (the adjusted light quantity) so as to be smaller than before setting. That is, the characteristic information processing unit 22 performs the re-adjustment processing of adjustment values. Specifically, when the adjusted light quantity generated by the variable iris 16 is within a certain range smaller than a predetermined first light quantity threshold value Lth1 (within the range Lmin to Lth1), in other words, when the characteristic information I1 supplied from the characteristic information detection unit 21 (i.e. the detected characteristic point luminance) is within a certain range smaller than a predetermined luminance threshold value Ith1 (within the range of 0 to Ith1), the setting value of the light quantity control signal S2 (the adjusted light quantity) is re-adjusted so that the adjusted light quantity becomes smaller than the set value, as shown by the arrows and the references G2 and G31 in FIG. 4. Consequently, in the state darker than the above-mentioned first luminance state, the final display luminance state becomes darker than before re-adjustment, that is, the luminance of the display light Lout is further lowered.

Thus, in the first embodiment, the variable iris 16 performs the light quantity adjustment for decreasing the light quantity of the light from the light source 11 based on the luminance information in the input video signal Din, and the video signal processing unit 23 performs the image correction for increasing the luminance level of the input video signal Din in accordance with the amount of the above-mentioned light quantity adjustment. This enables the light quantity adjustment and the image correction for lowering the black side (the dark side) image luminance, making it possible to improve sensible contrast feeling. Further, when the final display luminance state corresponding to the luminance state of the light modulated by the liquid crystal elements 14R, 14G and 14B (the display light Lout) is darker than a predetermined first luminance state, the characteristic information processing unit 22 re-adjusts the setting value of the light quantity control signal S2 (the adjusted light quantity) so as to be smaller than before setting. Consequently, in the state darker than the above-mentioned first luminance state, the final display luminance state becomes darker than before re-adjustment, that is, the luminance of the display light Lout is able to be further lowered. It is thus possible to more effectively improve sensible contrast feeling when the light quantity from the light source is changed with the video signal.

Specifically, when the adjusted light quantity generated by the variable iris 16 is within a certain range smaller than the predetermined first light quantity threshold value Lth1 (within the range Lmin to Lth1), in other words, when the characteristic information I1 (the detected characteristic point luminance) supplied from the characteristic information detection unit 21 is within a certain range smaller than the predetermined luminance threshold value Ith1 (within the range of 0 to Ith1), the setting value of the light quantity control signal S2 (the adjusted light quantity) is re-adjusted so that the adjusted light quantity becomes smaller than the set value. It is thus possible to obtain the above-mentioned advantages.

Alternatively, when the above-mentioned final display luminance state is darker than the first luminance state, re-adjustment may be performed so that the setting value of the light quantity control signal S2 (the adjusted light amount) becomes the lower limit value thereof. In the state darker than the first luminance state, the final display luminance state can be made darker, making it possible to further improving sensible contrast feeling.

As described above with reference to FIG. 3, the first embodiment has described the case where the variable iris 16 performs the light quantity adjustment so as to decrease the light quantity of the light from the light source 11, and the video signal processing unit 23 performs the image correction for increasing the luminance level of the input video signal Din. The light quantity adjusting method and the image correction method based on the luminance information of the input video signal Din are not limited to the above case, and other method may be employed to perform the light quantity adjustment and the image correction. However, the configuration for carrying out the light quantity adjustment and the image correction as shown in FIG. 3 is highly effective in improving sensible contrast feeling.

Second Embodiment

A second embodiment of the invention will be described below. The same references have been retained for components similar to those in the first embodiment, and the description thereof is therefore omitted.

Figure 5:
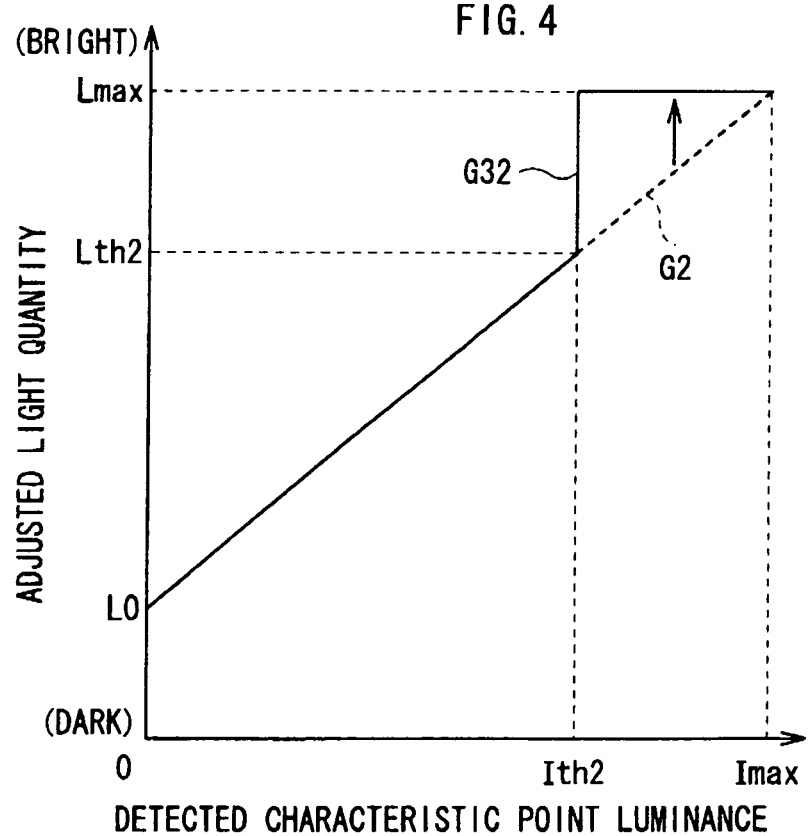
FIG. 5 is a characteristic diagram for explaining an example of re-adjustment processing of adjusted light quantity in a characteristic information processing unit in a second embodiment.

FIG. 5 shows an example of the adjustment value re-adjustment processing (adjusted light quality re-adjustment processing) by the characteristic information processing unit 22 in an image display apparatus (a liquid crystal projector) according to the second embodiment. Since the overall configuration of the image display apparatus of the second embodiment is the same as that of the first embodiment (the liquid crystal projector 1), the description thereof is omitted here.

When the final display luminance state (the final luminance state with respect to a user) corresponding to the luminance state of the light modulated by the liquid crystal elements 14R, 14G and 14B (the display light Lout) is brighter than a predetermined second luminance state, the characteristic information processing unit 22 re-adjusts at least one of the setting value of the light quantity control signal S2 (an adjusted light quantity) and the setting value of the image control signal S1 (a post-correction video signal luminance level), both being generated by the processing unit 22, in the opposite direction of the set adjustment direction or correction direction (i.e. performs the adjustment value re-adjustment processing). Specifically, for example, as shown in FIG. 5, when the light quantity after being adjusted by the variable iris 16 is within a certain range larger than a predetermined second luminance threshold value Lth2 (within the range Lth2 to Lmax), in other words, when the characteristic information I1 supplied from the characteristic information detection unit 21 (i.e. the detected characteristic point luminance) is within a certain range larger than the predetermined second luminance threshold value Ith2 (within the range Ith2 to Imax), the setting value of the light quantity control signal S2 (an adjusted light quantity) is re-adjusted so that the adjusted light quantity becomes larger than the setting value, as shown by the arrows and the references G2 and G32 in FIG. 5. Further, the setting value of the image control signal S1 (the post-correction video signal luminance level) is correspondingly re-adjusted so that the luminance level of the post-correction video signal D1 is lower than the setting value. This reduces the excessive light quantity adjustment and image correction to the white side (the bright side) image, for example, the image of the luminance region W1 in FIG. 3.

Thus, in the second embodiment, when the final display luminance state is brighter than the predetermined second luminance state, the characteristic information processing unit 22 re-adjusts at least one of the light quantity control signal S2 (the adjusted light quantity) and the image control signal S1 (the post-correction video signal luminance level) in the opposite direction of the set adjustment direction or correction direction. This reduces the excessive light quantity adjustment and image correction to the white side (the bright side) image, which occur along with the effect of improving sensible contrast feeling. Hence, in addition to the advantages produced by the first embodiment, the deterioration of fine gradation expression is able to be reduced while improving sensible contrast feeling.

Specifically, when the adjusted light quantity generated by the variable iris 16 is within a certain range larger than the predetermined second light quantity threshold value Lth2 (within the range Lth2 to Lmax), in other words, when the characteristic information I1 (the detected characteristic point luminance) supplied from the characteristic information detection unit 21 is within a certain range larger than the predetermined second luminance threshold value Ith2 (within the range Ith2 to Imax), the setting value of the light quantity control signal S2 (the adjusted light quantity) is re-adjusted so that the adjusted light quantity becomes larger than the set value. Further, the setting value of the image control signal S1 (the post-correction video signal luminance level) is correspondingly re-adjusted so that the luminance level of the post-correction video signal D1 becomes lower than the set value. These re-adjustment produce the above-mentioned advantages.

Additionally, when the above-mentioned final display luminance state is brighter than the second luminance state, the setting value of the light quantity control signal S2 (the adjusted light amount) and the setting value of the image control signal S1 (the post-correction video signal luminance level) are re-adjusted to a pre-adjustment light quantity and a pre-correction video signal luminance level, respectively, as shown by the reference G32 in FIG. 5. In this case, the light quantity of the light from the light source 11 and the luminance level of the post-correction video signal D1 are re-adjusted to the pre-adjustment value and the pre-correction value, respectively. Therefore, it becomes possible to completely eliminate the excessive light quantity adjustment and image correction to the white side (the bright side) image, as described above. This enables to avoid the deterioration of fine gradation expression and hold the state prior to the light quantity adjustment and the image correction.

Although the invention has been described above based on the foregoing first and second embodiments, the invention is not limited thereto, and various modifications may be made therein. For example, it is possible to make the following different modifications.

Figure 6:
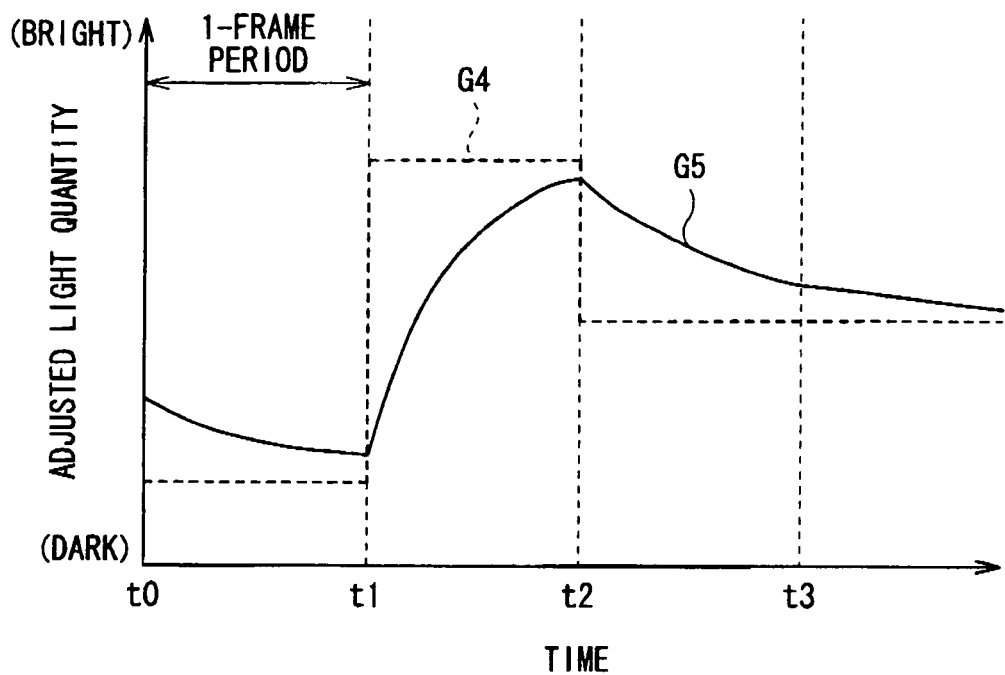
FIG. 6 is a timing chart showing an example of asymptotic control processing based on a re-adjust target value.

Instead of the actual adjustment values, target values G4 shown in FIG. 6 may be used as the light quantity control signal S2 supplied from the characteristic information processing unit 22 and the re-adjustment value of the image control signal S1 (the adjusted light quantity or the post-correction video signal luminance level) after re-adjustment, so that the light quantity adjustment or the luminance level correction of the input video signal Din may be asymptotically performed on a frame by frame basis (on a time-interval basis such as timings t0 to t1, t1 to t2 and t2 to t3), as shown by actual adjustment values G5 in FIG. 5. In this case, for example, when displaying the image having large luminance variations with time, such as the image having frequent flickering, the discontinuity in light quantity adjustment amount is reduced to suppress the transient influence, enabling to reduce flickering or the like on the display screen.

Figure 7:
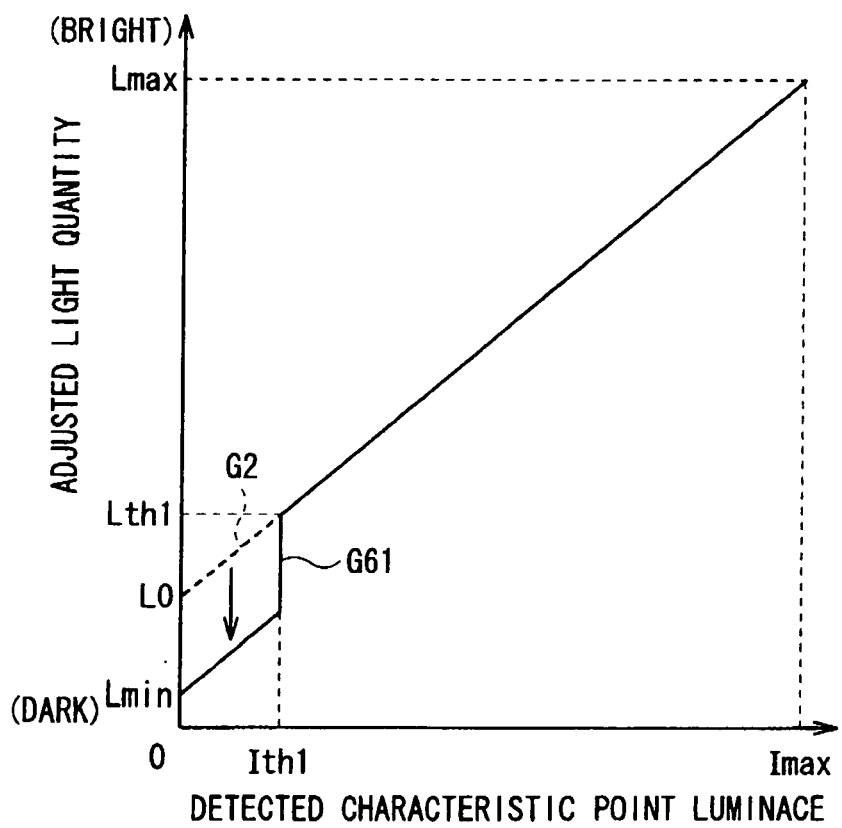
FIG. 7 is a characteristic diagram for explaining another example of the re-adjustment processing of adjusted light quantity in the characteristic information processing unit.

In the first embodiment, as shown by the arrow and the reference G31 in FIG. 4, when the final display luminance state is darker than the predetermined first luminance state, the setting value of the light quantity control signal S2 (the adjusted light amount) is re-adjusted to the lower limit value thereof (the light quantity Lmin). Alternatively, as shown in the arrow and reference G61 in FIG. 7, the re-adjustment to the pre-adjustment and pre-correction setting values is not necessary as long as at least one of the light quantity control signal S2 (the adjusted light quantity) and the image control signal S1 (the post-correction video signal luminance level) is re-adjusted in the opposite direction of the set adjustment direction or correction direction.

Figure 8:
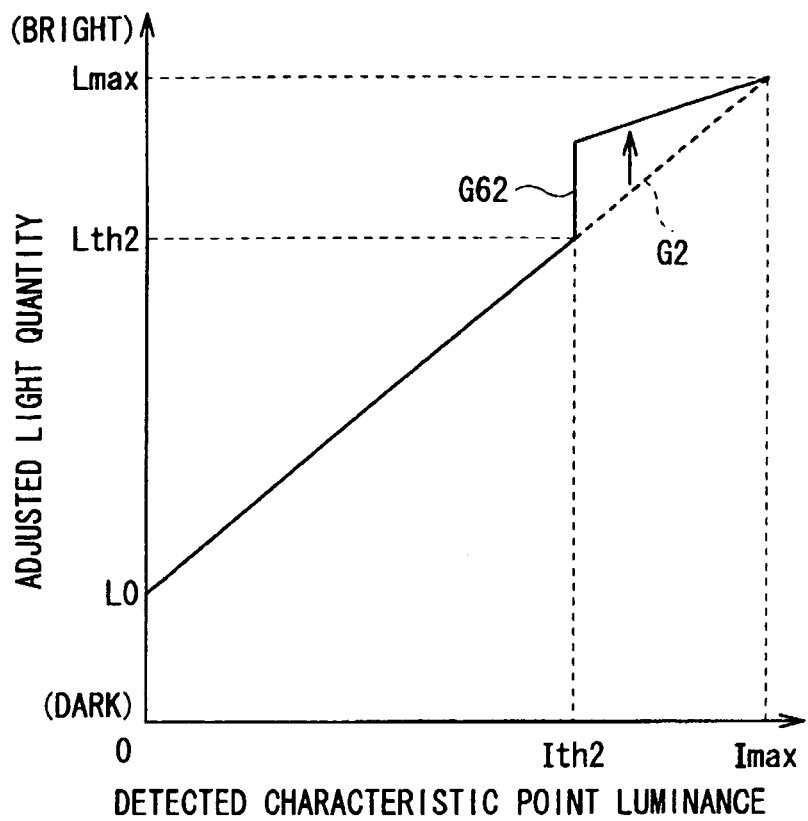
FIG. 8 is a characteristic diagram for explaining another example of the re-adjustment processing of adjusted light quantity in the characteristic information processing unit.

In the second embodiment, as shown by the arrow and the reference G32 in FIG. 5, when the final display luminance state is brighter than the predetermined second luminance state, the setting value of the light quantity control signal S2 (the adjusted light amount) and the setting value of the image control signal S1 (the post-correction video signal luminance level) are re-adjusted to the pre-adjustment light quantity and the pre-correction video signal luminance level, respectively. Alternatively, as shown in the arrow and reference G62 in FIG. 8, the re-adjustment to the lower limit value is not necessary as long as the light quantity control signal S2 (the adjusted light quantity) is re-adjusted to a smaller value.

In the first embodiment, the adjustment value re-adjustment processing is performed when the adjusted light quantity generated by the variable iris 16 is within a certain range smaller than the predetermined first light quantity threshold value Lth1 (within the range Lmin to Lth1), in other words, when the characteristic information I1 supplied from the characteristic information detection unit 21 (i.e. the detected characteristic point luminance) is within a certain range smaller than the predetermined first luminance threshold value Ith1 (within the range of 0 to Ith1). Alternatively, the adjustment value re-adjustment processing may be performed when the proportion of pixels, having a post-correction video signal D1 indicating a luminance level lower than a predetermined luminance threshold value, is larger than a predetermined first pixel threshold value (for example, 30%). In general, there is a certain relationship between the light quantity adjustment amount and the correction amount of the video signal luminance level, and therefore both indexes may be used to perform the adjustment value re-adjustment processing.

In the second embodiment, the adjustment value re-adjustment processing is performed when the adjusted light quantity generated by the variable iris 16 is within a certain range larger than the predetermined second light quantity threshold value Lth2 (within the range Lth2 to Lmax), in other words, when the characteristic information I1 supplied from the characteristic information detection unit 21 (i.e. the detected characteristic point luminance) is within a certain range larger than the predetermined second luminance threshold value Ith2 (within the range Ith2 to Imax). Alternatively, the adjustment value re-adjustment processing may be performed when the proportion of pixels, having a post-correction video signal D1 indicating a luminance level higher than a predetermined second pixel threshold value, is larger a predetermined second pixel threshold value (for example, 30%). In general, there is a certain relationship between the light quantity adjustment amount and the correction amount of the video signal luminance level, and therefore both indexes may be used to perform the adjustment value re-adjustment processing.

The predetermined luminance states (for example, the predetermined light quantity threshold values Lth1 and Lth2, the predetermined luminance threshold values Yth1, Yth2, Ith1 and Ith2, and the predetermined pixel threshold value) may be adjustable in accordance with, for example, the image pattern based on the input video signal Din.

In the foregoing embodiments, although the variable iris 16 is arranged behind the liquid crystal elements 14R, 14G and 14B, the variable iris 16 may be arranged before these elements so as to adjust the light quantity of the light from the light source 11.

Instead of the above-mentioned configuration that the light source 11 is constructed from the halogen lamp, the metal halide lamp or the xenon lamp, and the variable iris 16 adjusts the light quantity of the light from the light source 11, the light source 11 may include, for example, a light emitting diode (LED). In this case, the light quantity of the light from the light source 11 is adjustable by changing the supply voltage to the LED based on the luminance information in the input video signal Din.

Although the so-called 3-modulation-panel projection display (projectors) have been described above, the present invention is also applicable to projection display apparatuses of other mode.

Figure 9:
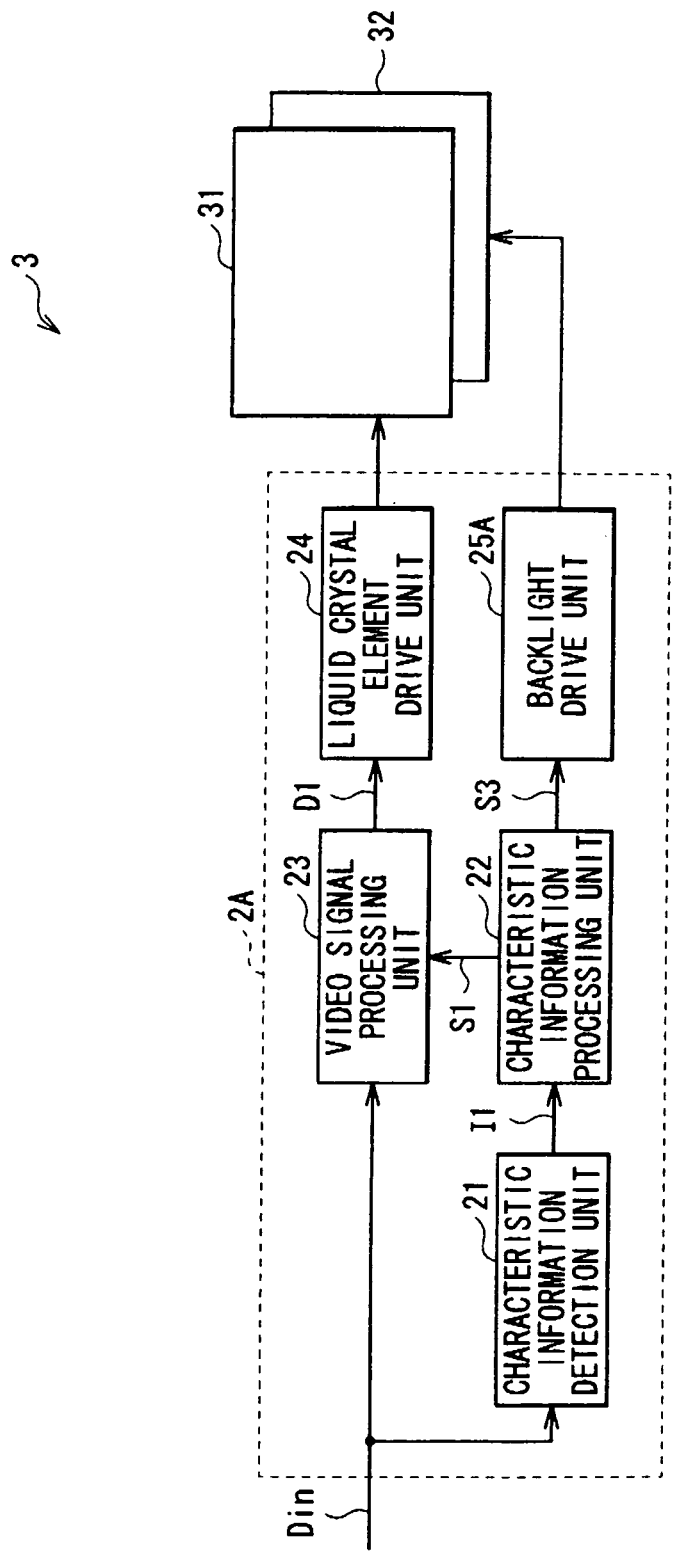
FIG. 9 is a block diagram showing a configuration of an image display apparatus according to a modification of the invention.

Instead of the configuration as the projection display apparatus (the liquid crystal projector 1) provided with the projection means (the projection lens 17) for projecting the light modulated by the spatial light modulation elements (the liquid crystal elements 14R, 14G and 14B) onto the screen 18, the present invention may be applied to direct-view type display apparatuses such as a liquid crystal TV 3, as shown in FIG. 9. Specifically, the liquid crystal TV 3 has a liquid crystal display panel 31 including liquid crystal elements (not shown), a backlight unit 32 as a backlight light source of the liquid crystal display panel 31, and a controller 2A. The backlight unit 32 includes, for example, an LED. A backlight drive unit 25A within the controller 2A adjusts the light quantity of the light from the backlight unit 32 by changing the supply voltage to the LED, based on a light quantity control signal S3 supplied from the characteristic information processing unit 22. This direct-view type display apparatus also produces the same advantages as the foregoing embodiments.

Instead of the transmission type liquid crystal display apparatus (the liquid crystal projector 1) using the so-called transmission type spatial light modulation elements (the liquid crystal elements 14R, 14G and 14B), the present invention is also applicable to the reflection type liquid crystal display apparatuses (liquid crystal projectors and the like) using so-called reflection type spatial light modulation elements (liquid crystal elements and the like).

Although in the foregoing embodiments, the spatial light modulation elements are the liquid crystal elements (the liquid crystal elements 14R, 14G and 14B) and configured as the liquid crystal display apparatus (the liquid crystal projector 1), for example, DMDs (digital micromirror devices) may be used as other spatial light modulation elements.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
a light source;
a spatial light modulation element modulating light from the light source based on a video signal;
light quantity adjustment means for adjusting the light quantity of light from the light source based on luminance information in the video signal;
image correction means for correcting luminance level of the video signal in accordance with light quantity adjustment by the light quantity adjustment means, and supplying a corrected video signal to the spatial light modulation element; and
re-adjustment means for performing re-adjustment such that a light quantity adjustment target is re-adjusted to a lower value, in a case that a final display luminance level, representing a luminance of the light modulated by the spatial modulation element, is lower than a predetermined first luminance level, where the light quantity adjustment target represents an adjustment target value in the light quantity, employed by the light quantity adjustment means,
in which the light quantity adjustment means asymptotically adjusts, on a frame by frame basis, the light quantity of the light from the light source based on the light quantity adjustment target re-adjusted by the re-adjustment means such that (i) adjusted light quantity for a first frame is asymptotic towards a first adjusted light quantity value, (ii) adjusted light quantity for a second frame is asymptotic towards a second adjusted light quantity value, and (iii) adjusted light quantity for a third frame is asymptotic towards a third adjusted light quantity value,
in which the first adjusted light quantity value is different from the second adjusted light quantity value, and the third adjusted light quantity value is between the first adjusted light quantity value and the second adjusted light quantity value, and
in which the second frame is immediately adjacent to the first frame such that the second frame occurs immediately after the first frame, and the third frame is immediately adjacent to the second frame such that the third frame occurs immediately after the second frame.

2. The image display apparatus according to claim 1, wherein, in the case that the light quantity adjustment target is lower than a predetermined first light quantity threshold value, the re-adjustment means performs the re-adjustment of the light quantity adjustment target.

3. The image display apparatus according to claim 1, wherein, in the case that the proportion of pixels where luminance level correction targets fall below a predetermined luminance threshold value is higher than a predetermined first pixel threshold value, the re-adjustment means performs the re-adjustment of the light quantity adjustment target.

4. The image display apparatus according to claim 1, wherein, in a case that the final display luminance level is lower than the first luminance level, the re-adjustment means performs the re-adjustment such that the light quantity adjustment target is re-adjusted to a minimum value.

5. The image display apparatus according to claim 1, wherein the first luminance level is variable.

6. The image display apparatus according to claim 5, wherein the first luminance level is variable in accordance with an image pattern based on the video signal.

7. The image display apparatus according to claim 1, wherein the luminance information represented by the video signal are luminance histogram distribution in a display region.

8. The image display apparatus according to claim 7, wherein, in a case that maximum luminance value in the luminance histogram distribution is lower than a predetermined luminance value, the re-adjustment means performs the re-adjustment of the light quantity adjustment target.

9. The image display apparatus according to claim 1, wherein image correction means corrects the video signal so that luminance level of the video signal increases as the light quantity is adjusted to decrease by the light quantity adjustment means.

10. The image display apparatus according to claim 9, wherein the re-adjustment means performs the re-adjustment such that, of a light quantity adjustment target and a luminance level correction target, at least the luminance level correction target is re-adjusted to a value in an opposite direction from a correction direction by the image correction means, in a case that the final display luminance level is higher than a predetermined second luminance level, where the luminance level correction target represents a correction target value in the luminance level of the video signal, employed by the image correction means.

11. The image display apparatus according to claim 10, wherein in the case that the light quantity adjustment target is higher than a predetermined second light quantity threshold value, the re-adjustment means re-adjusts the light quantity adjustment target to a higher value.

12. The image display apparatus according to claim 10, wherein in the case that the proportion of pixels where luminance level correction targets exceed a predetermined second luminance threshold value is higher than a predetermined second pixel threshold value, the re-adjustment means re-adjusts the luminance level correction target into a lower value.

13. The image display apparatus according to claim 10, wherein in the case that the final display luminance level is higher than the predetermined second luminance level, the re-adjustment means re-adjusts the light quantity adjustment target into a non-adjusted value, and re-adjusts the luminance level correction target into a non-corrected value.

14. The image display apparatus according to claim 1, further comprising projection means for projecting, onto a screen, light modulated by the spatial modulation element, wherein
the light quantity adjustment means is configured as a variable iris to perform light quantity adjustment by reducing the light quantity of the light from the light source.

15. The image display apparatus according to claim 14, wherein
the spatial modulation element is a liquid crystal element, and
the image display apparatus is configured as a liquid crystal projector.

16. The image display apparatus according to claim 1, wherein
the spatial modulation element is a liquid crystal element,
the light source is a backlight located behind the liquid crystal element, and
the image display apparatus is configured as a liquid crystal display apparatus.

17. The image display apparatus according to claim 16, wherein
the backlight includes a light emitting diode (an LED), and the light quantity adjustment means adjusts the light quantity of the light from the backlight by changing supply voltage to the LED based on the luminance information represented by the video signal.

18. An image display apparatus comprising:

a light source;

a spatial light modulation element modulating light from the light source based on a video signal;

light quantity adjustment section adjusting the light quantity of light from the light source based on luminance information in the video signal;

image correction section correcting luminance level of the video signal in accordance with light quantity adjustment by the light quantity adjustment section, and supplying a corrected video signal to the spatial light modulation element; and re-adjustment section performing re-adjustment such that a light quantity adjustment target is re-adjusted to a lower value, in a case that a final display luminance level, representing a luminance of the light modulated by the spatial modulation element, is lower than a predetermined first luminance level, where the light quantity adjustment target represents an adjustment target value in the light quantity, employed by the light quantity adjustment section, in which the light quantity adjustment section asymptotically adjusts, on a frame by frame basis, the light quantity of the light from the light source based on the light quantity adjustment target re-adjusted by the re-adjustment section such that (i) adjusted light quantity for a first frame is asymptotic towards a first adjusted light quantity value, (ii) adjusted light quantity for a second frame is asymptotic towards a second adjusted light quantity value, and (iii) adjusted light quantity for a third frame is asymptotic towards a third adjusted light quantity value, in which the first adjusted light quantity value is different from the second adjusted light quantity value, and the third adjusted light quantity value is between the first adjusted light quantity value and the second adjusted light quantity value, and in which the second frame is immediately adjacent to the first frame such that the second frame occurs immediately after the first frame, and the third frame is immediately adjacent to the second frame such that the third frame occurs immediately after the second frame.

* * * * *